US006546298B1

(12) United States Patent
Bull

(10) Patent No.: US 6,546,298 B1
(45) Date of Patent: Apr. 8, 2003

(54) SPEAKER APPARATUS AND A COMPUTER SYSTEM INCORPORATING SAME

(75) Inventor: Jeffrey A. Bull, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/098,779

(22) Filed: Jun. 17, 1998

(51) Int. Cl.[7] .............................................. G06F 17/00
(52) U.S. Cl. ......................................... 700/94; 381/332
(58) Field of Search .......................... 381/28, 101, 109, 381/98, 332; 700/94

(56) References Cited

U.S. PATENT DOCUMENTS

| | | | |
|---|---|---|---|
| 4,440,260 A | 4/1984 | Jacobsen | |
| 5,147,986 A | 9/1992 | Cockrum et al. | |
| 5,177,329 A | 1/1993 | Klayman | |
| 5,269,598 A | 12/1993 | Liu | |
| 5,406,637 A | 4/1995 | Gonzalez | |
| 5,450,495 A | 9/1995 | Goldfarb | |
| 5,517,573 A | 5/1996 | Polk et al. | |
| 5,550,921 A | 8/1996 | Freadman | |
| 5,623,132 A | 4/1997 | Gahm | |
| 6,011,852 A * | 1/2000 | Howard | 381/24 |

* cited by examiner

*Primary Examiner*—Minsun Oh Harvey
(74) *Attorney, Agent, or Firm*—TraskBritt

(57) ABSTRACT

An internal subwoofer apparatus is provided for mounting within a computer system. The computer system is a multimedia computer system that processes visual and audio recording and playback. The central processing unit box typically includes the motherboard on which is mounted the main central processing unit as well as any ancillary processing chips needed for the computer system. The computer system also includes memory modules such as short term memory, long term memory storage in the form of hard disk drives or removable floppy disk drive systems, as well as long term disk storage systems, such as CD-ROM systems. User input to the computer system is provided by either a keyboard and optionally a pointing device, such as a mouse or track ball. A monitor that displays video signals is provided in addition to the internal subwoofer apparatus and the audio system includes a pair of satellite speakers serving as a first channel and a second channel.

31 Claims, 2 Drawing Sheets

SPEAKER APPARATUS AND A COMPUTER SYSTEM INCORPORATING SAME

BACKGROUND OF THE INVENTION

The present invention relates generally to speaker systems for use with computer systems and, more particularly, to a woofer/subwoofer speaker apparatus contained within a computer housing. More particularly still, the present invention relates to a speaker assembly that, during manufacture, is quickly and easily placed within a computer housing, that occupies a limited volume and that is universally designed so as to be adaptable in various orientations.

Audio speaker systems are well known in the art. Speaker systems have evolved from a single monaural speaker to multiple speakers that produce stereo sound that is more realistic sounding to the typical listener. Each speaker unit in a stereo speaker system typically comprises a plurality of speaker drivers within a single enclosure. The speaker unit typically uses two to three speakers, or more, with one speaker reproducing upper frequencies and another speaker reproducing lower frequencies. A third speaker sometimes is added to reproduce the lowest frequencies desired.

Recently, however, the trend has been to utilize multiple channels, which has led to using separate enclosures for each speaker. This allows the speaker system to have smaller components with the ability to place the speakers in discrete locations otherwise not possible with the larger enclosures typically used in previous speaker designs. Additionally, the woofer/subwoofer unit in the satellite speaker systems typically only produces a monaural tone as well and thus a second, matching stereo speaker is not necessary. With this in mind, speaker designers have attempted to optimize the acoustics reproduction of small enclosed subwoofer designs in order to save on space or to locate this speaker unit in less conspicuous locations.

Another advance in subwoofer speaker design that has decreased the overall unit size is the utilization of ported chambers. The ported chambers also enhance the sound quality of the speaker system, as well as increase the speaker's responsiveness without adding to, or in some instances by even minimizing, the inherent distortion of the speaker. One design for a ported speaker system is shown in U.S. Pat. No. 5,623,132 issued Apr. 22, 1997, entitled "Module Port Tuning Kit." This reference discloses the concept of adding a modular port to a speaker enclosure to enhance the responsiveness and accuracy of the speaker itself. A more complicated enclosure system is disclosed in U.S. Pat. No. 5,147,986, issued Sep. 15, 1992, entitled "Subwoofer Speaker System." This patent discloses a subwoofer system that divides the enclosure into at least three chambers. Each chamber is tuned and acoustically coupled, one to another, so as to optimize speaker responsiveness while minimizing the enclosure volume. Both of these patents disclose what would be excellent speaker designs for designing and implementing a subwoofer speaker assembly that stands alone.

The use of speaker systems has expanded from that of reproducing sound in a stereo system to reproducing a rich, sonorous environment of surround sound in multi-media systems that include video replay in television and personal computer systems. It is in the computer multi-media system that conventional speaker systems such as disclosed in the above-referenced patents, although useful, have several drawbacks. For one, both such speaker systems still require a separate enclosure that occupies a certain amount of space.

In a multi-media computer system, one must include not only the CPU box of the computer system, but also the monitor, keyboard, pointing device, printer, and any auxiliary peripheral devices that take up valuable desk or floor real estate either at home or in the office. Adding multimedia capabilities to the computer system requires sound to be reproduced and, to reproduce stereo sound, at least two speakers are required, for a right and left channel. Early personal computer systems included a monaural single speaker that was mounted within the computer system and only provided amusing beeps and tones, but never could duplicate stereo sound or full, rich audio sound currently desired by today's users.

Accordingly, the same type of satellite speaker systems that have been used in both audio hi-fidelity systems and video systems with audio hi-fidelity have made their way to the market of personal computers. These include a right channel speaker, left channel speaker, and a monaural subwoofer unit. This requires three new components to be placed on the already crowded desktop of the computer user. Some users have gone to free up desk space by placing the CPU box on the floor or in another out-of-the-way location. Such an approach is helpful in that additional desktop space is then available. Further, the user can place the subwoofer anywhere close, without it having to be optimally positioned as is required by the right or left speaker. This is because the subwoofer does not produce stereophonic sound, but merely enhances the audio experience by providing the lower frequencies. It is -well known to speaker design engineers that a single subwoofer system is more than adequate for reproducing the low frequency end of the audio spectrum needed for full audio reproduction.

Placing the CPU box under the desk or moving it away from the desktop, as well as moving the subwoofer system off the desktop and in an inconspicuous place, are good approaches to provide additional desktop real estate. Unfortunately, they create additional clutter either under the desk or in the separate storage area where the two units must be provided. Additionally, in shipping systems with -multiple speaker sets, a larger shipping box is necessary to accommodate the typically much-larger subwoofer assembly than the two satellite speakers. This, in turn, incurs additional shipping costs as well as packing costs in terms of material and labor and time delays experienced in packing the unit.

Thus, what is needed is a satellite speaker system that overcomes the storage problems of the prior art by placing a subwoofer somewhere useful to the-end user, and without taking up unnecessary space otherwise required by the user. This advantage would also overcome and reduce the costs of packing, shipping, and handling of an entire multi-media computer system. Further, such a subwoofer configuration should have the same acoustic benefits that ported subwoofer designs offer.

BRIEF SUMMARY OF THE INVENTION

According to the present invention, an internal subwoofer apparatus is provided that is placed within the central processing unit (CPU) box of a computer system. The computer system may be a multi-media personal computer system that is capable of providing visual and audio recording and playback. The CPU box typically includes the motherboard that houses the main central processing unit as well as any ancillary processing chips needed for the computer system. The CPU box may also include memory modules such as short term random access memory, long term disk storage memory in the form of hard disk drives or removable floppy disk drive systems, as well as long term hard disk storage units such as CD-ROM systems. User input to the computer system may be provided by a keyboard and, optionally, a pointing device, such as a mouse or track ball. A monitor that displays video signals viewable by the user may be provided and be connected to the CPU and driven by either the main central processing unit or by a separate video processor, such as a video card. An audio system may be provided that includes a pair of satellite speakers serving as a first channel and a second channel, typically known as the right and left channels, and further includes a subwoofer unit located in the CPU box. The CPU box can be oriented in a tower configuration or a desktop configuration.

The subwoofer unit is mounted in a lower front portion of the box, if it is a tower box, or in a front side portion, if it is a desktop box. The subwoofer is ported to enhance audio reproduction and to conserve space. The speaker may be mounted in a down-fire position, meaning that the front of the speaker is mounted downwardly against a vibration and sound absorbing mat, while the reflecting sound echos within the chamber and then is enhanced through the port that opens to the front of the computer system. A separate volume control and on/off switch can be provided on the exterior of the CPU so as to either activate or deactivate the subwoofer within the CPU box. The switch and the subwoofer are coupled to the motherboard or, alternatively, to an audio sound card installed within a computer system.

DETAILED DESCRIPTION OF THE INVENTION

Figure 1:
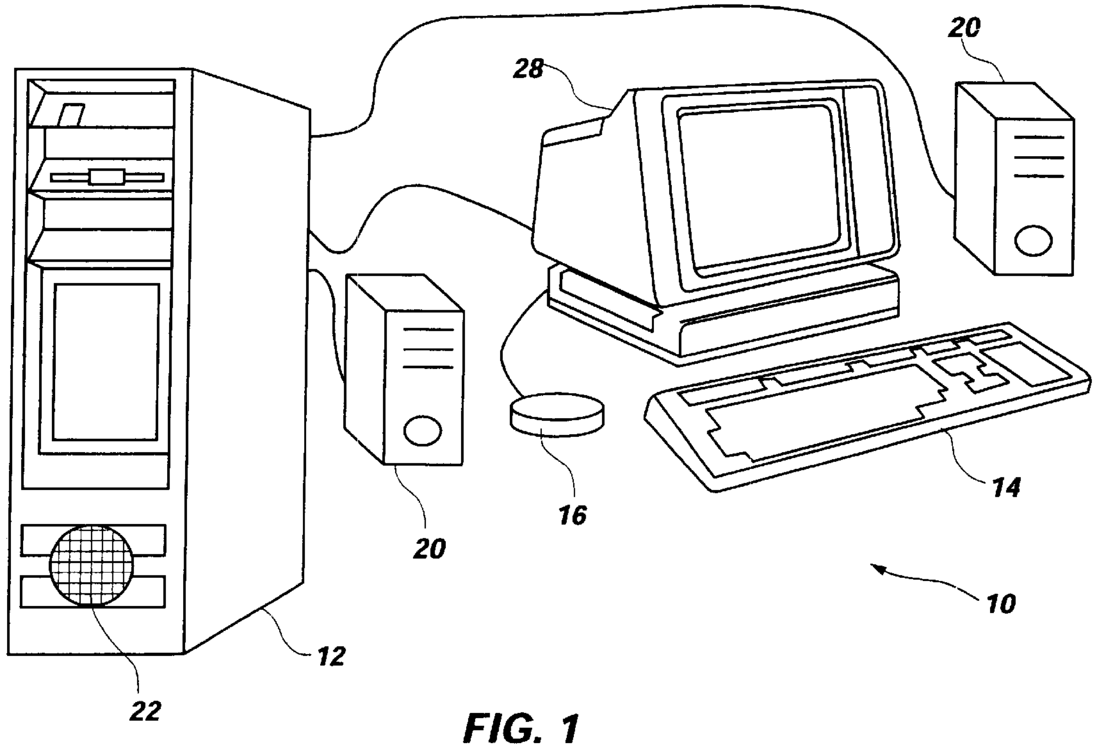
FIG. 1 is a diagram representing a computer system that has multi-media capabilities and incorporates a subwoofer apparatus within the central processing unit box.
Figure 6:
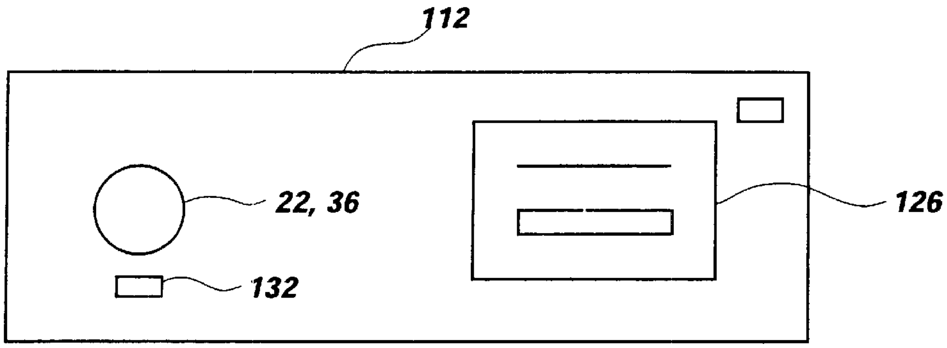

As depicted in FIG. 1, a computer system 10 includes a central processing unit (CPU) box 12, which is attached to a user input device, such as keyboard 14, and pointing device 16, an output device, such as monitor 18, and a pair of speakers 20. Computer system 10 further includes an integral woofer or subwoofer apparatus 22, found within box 12 and including a port 36 (see FIG. 2). CPU box 12 is shown in further detail in FIG. 2. CPU box 12 is configured in a tower configuration, which means it stands substantially in a vertically upright orientation, as opposed to a desktop configuration, which stands in a substantially horizontally prone orientation as shown in FIG. 6.

Figure 2:
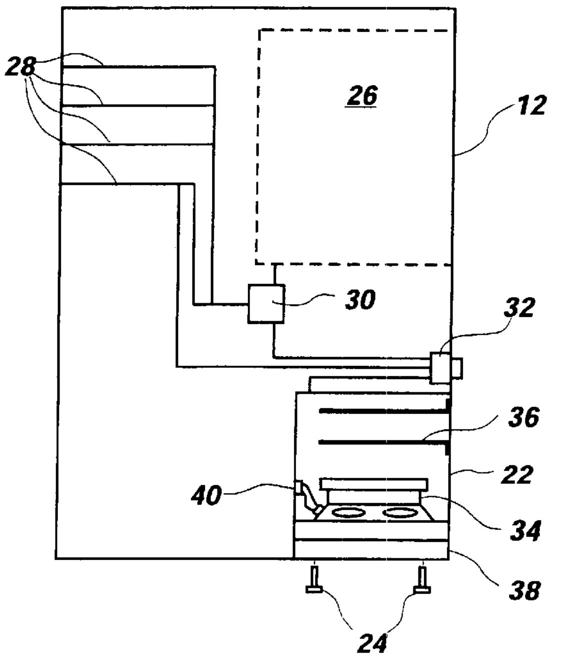
FIG. 2 is a cut-away schematic side view of the CPU box of FIG. 1.

FIG. 2 is a cross-sectional, schematic diagram of CPU box 12 from FIG. 1. Within CPU box 12 there is speaker apparatus, woofer or subwoofer, hereinafter sometimes referenced for convenienced merely as "subwoofer"); which is held in place via fasteners 24. Fasteners 24 can comprise any type of mechanical fastener or chemical fastener such as screws, nylon clips, metal clips, adhesive, or friction fitting. CPU box 12 further includes a drive bay 26 that holds additional peripheral devices such as a floppy disk drive, one or more hard disk-drives, a CD-ROM drive, and the like. Behind the drive bay 26 is plurality of computer cards 28. Each card can perform a different function such as serving as a modem or an audio sound card, or a video card. Also within CPU box 12 is a motherboard that includes central processing unit CPU 30 that performs the bulk of the processing within the overall computer system. CPU 30 may be any conventional, general purpose single-or multi-chip microprocessor such as a Pentium® Processor or a Pentium® Pro-processor, an 851 Processor, a MIPS® Processor, a Power PC® Processor, or an ALPHA® Processor. In addition, the CPU 30 may be any conventional, special purpose microprocessor such as a digital signal processor, an audio signal processor, or a video graphics processor. As shown in FIG. 2, CPU 30 is coupled to audio subwoofer 22 and is further coupled to the devices installed in drive bay 26 and to the add-on computer cards 28.

Further included in CPU box 12 is subwoofer controller 32. Controller 32 is coupled to both subwoofer 22 and to CPU 30. Controller 32 may also be coupled to an audio sound card 28. Controller 32 activates subwoofer 22 when the computer 10 is on, thus supplying power to subwoofer 22. Additionally, controller 32 includes a volume control device that allows the user to adjust the volume to a desired level. Subwoofer apparatus 22 further includes a speaker 34. Speaker 34 is mounted against the bottom surface of the container used for subwoofer 22. Speaker 34 may range in diameter from three inches to as large as six inches, or more, depending on the size of the CPU box 12. The dimensions of subwoofer 22 are dictated by the size of CPU box 12. For a large box, subwoofer 22 can occupy a relatively larger volume. For a smaller box, woofer apparatus 22 would be sized accordingly.

In one embodiment, the interior dimensions of subwoofer 22 are five inches on all sides to form a five inch cube. The diameter of speaker 34 thus can be no greater than five inches. In this embodiment, it is desired that the speaker diameter be four inches.

To enhance the audio response of subwoofer apparatus 22 and keep its size compact, a port 36 is provided. Port 36 is adjusted so that it has a length of substantially four-fifths the depth of the container for subwoofer 22 and a diameter of substantially one-fifth of the height of the container. Further, the port is placed at substantially one-fifth of the height of the top container portion and is centered across the front portion of the container. Thus, for a five inch cube container structure, port 36 will be four inches long with a diameter of substantially one inch and off-set substantially one inch from the top of the container for subwoofer 22. Additionally, the front portion of port 36 tapers outward to a diameter larger than the inner diameter of port 36. The second diameter is at a ratio of substantially 1.5:1 to the first diameter. In alternative embodiments, the container for subwoofer apparatus 22 may have a greater height, greater width, or greater depth. These dimensions are determined by the audio response desired by the speaker designer, as well as the space limitations found within the CPU box 12. For example, a container box that is seven inches high, six inches deep, and six inches in width, would allow for a larger speaker driver to be placed therein and a sound port having a larger volume because of the larger box dimensions.

Figure 3:
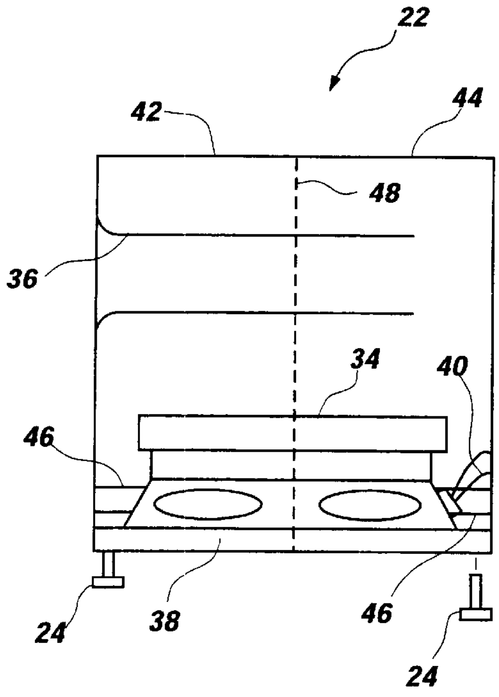
FIG. 3 is a cut-away side view schematic diagram of the subwoofer apparatus of FIG. 2 shown in enlarged detail.

FIG. 3 depicts an enlarged cross-sectional schematic diagram of subwoofer 22 found in FIG. 2. Subwoofer 22 includes two container units 42 and 44 that join together along the center line 48 (shown in ghosted form) to form a shell. The half shells formed by each of container units 42 and 44 make for quick and easy assembly. At least one or more speaker retaining elements 46 is located in each container unit 42, 44. These retaining elements 46 are designed so that speaker 34 can be quickly inserted into either container unit 42 or 44 and then assembly is completed upon the joining together of the two container units 42, 44 to form a shell. Retaining elements 46 can include any type of mechanical retainer such as, for example, spring clips, of metal or plastic, molded bridges or recesses that conform to the edge of speaker 34, or foam gaskets that wedge in place and provide additional sound dampening.

Once container units 42 and 44 are mated, a plurality of speaker fasteners, 24 is inserted into subwoofer apparatus 22. A fastener 24 is inserted in each corner to secure speaker 34 in place as well as to hold units 42 and 44 together. Speaker 34 is electrically connected to connector 40 that provides connection to the CPU located in CPU box 12. Speaker 34 is placed on motion and sound dampener 38. Motion and sound dampener 38 is made of a desired dampening material suitable for use in an acoustical speaker assembly. This can include a flexible rubber mat, a neoprene mat, or a fiberglass liner. Motion and sound dampener 38 serves to isolate speaker 34 from the vibrations encountered within CPU box 12 as well as to dampen any acoustic vibration caused by the speaker within the box and lessen interference in the performance of subwoofer 22. Additional acoustic dampening material may be lined within subwoofer 22 as desired.

Figure 4:
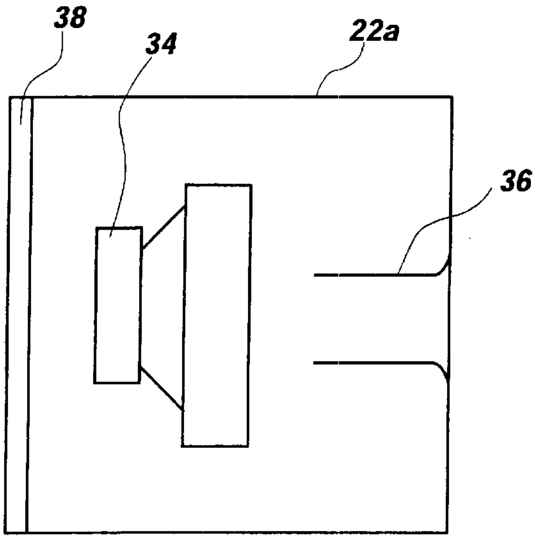
FIG. 4 depicts a side view schematic diagram of an alternative ported speaker system according to the present invention.

FIG. 4 depicts a cross-sectional schematic diagram of an alternative embodiment of subwoofer 22. Subwoofer apparatus 22*a* includes a speaker 34 that is mounted in a direct facing position aligned with port 36. Behind speaker 34 is placed a sound dampening or acoustic vibration dampening material 38. This direct fire embodiment of FIG. 4 is designed such that port 36 is again size to have a diameter one-fifth of that of overall container of subwoofer 22*a*. The length of port 36 is 40% of the width of the container used for subwoofer 22*a*. In one embodiment, port 36 is centered in the subwoofer 22*a*, but can be moved up or down, or left or right as desired for acoustic optimization.

Figure 5:
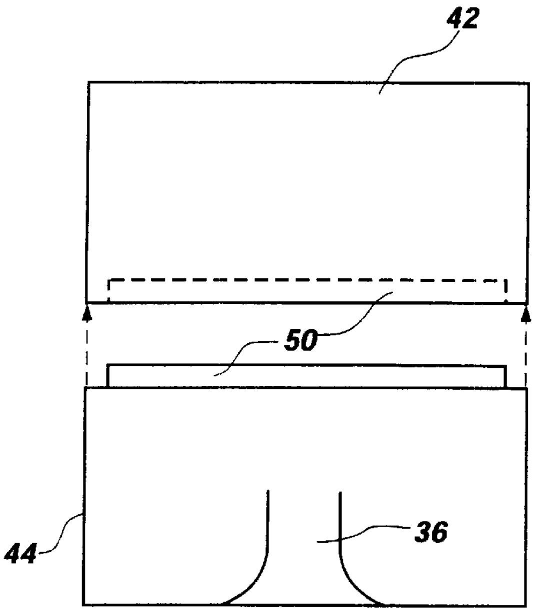
FIG. 5 depicts a connecting mechanism used to attach the subwoofer speakers enclosure shown in FIG. 3; and, FIG. 6 depicts an alternative desktop CPU box incorporating the subwoofer apparatus according to the present invention.

FIG. 5 depicts a view of separated containers 42 and 44 previously shown in FIG. 3. They are self-aligned together and held in place with a friction alignment element 50. FIG. 6 depicts an alternative embodiment of the CPU box. In FIG. 6, a desktop box 112 has a speaker port 36 mounted to one side with disk drives 126 mounted in another side. A speaker controller switch 132 is also provided on the front of the CPU box 112. Subwoofers 22 and 22*a* have a universal design that allows then to be placed in either an upright or tower CPU box 12 of FIG. 1, or in a prone or desktop CPU box 112 as shown in FIG. 6. The only difference is that fasteners 24 would secure the bottom of CPU box 112 from underneath in the embodiment of FIG. 6.

As will be apparent to those skilled in the art a number of variations and modifications of the described invention can also be used. Port shapes other than the round port thus depicted can be used, such as oval, elliptical, parabolic, square, rectangular, and other polygonal shapes. A single port can be replaced by two or more smaller ports. The subwoofer assembly can employ more than one speaker as well as more than one chamber. The absolute and relative sizes of the chambers; or enclosures, can be adjusted, particularly as needed to adjust the frequency response in coordination with the characteristics of other speakers, such as the midrange or tweeter speakers that are found in the satellite pair of speakers 20. Although standard conical speakers are depicted, other shapes of speakers can be used, such as parabolic, oval, elliptical, planar, and the like.

When speaker apparatus 22 is used as a subwoofer speaker, a low frequency bi-pass circuit is provided that cuts off signals having a frequency greater than about 100-120 hertz. A typical bypass filter is a resister-capacitor circuit that is tuned to allow signal frequencies of 100-120 hertz or lower to pass to speaker 34. If speaker 34 is to also reproduce higher frequencies, then a higher bypass filter would be required. Typically, in such an instance, the cut-off level would be at 200 hertz and above. Thus, the RC circuit would be tuned to pass frequencies at 200 hertz or below for output on speaker 34. It is, of course, understood that the cut off should not be taken as limited to 100 or 200 hertz, but may extend to a higher frequency as desired.

Although the invention has been described by way of a preferred embodiment and various modifications and variations, other modifications and variations can also be used within the scope of the invention, the invention being defined by the appended claims and equivalence thereof.

What is claimed is:

1. A computer system comprising:

a central processing unit (CPU) box, comprising:

- a central processing unit;
- a drive bay coupled to said central processing unit;
- a speaker apparatus, coupled to said central processing unit and removably mounted towards a front portion of said CPU box, comprising:
  - a speaker container;
  - a speaker removably retained within said speaker container;
  - a speaker port coupled to said speaker container to provide acoustic coupling between said speaker and a region outside said speaker container;

a user input device, coupled to said central processing unit; and an output device, coupled to said central processing unit.

2. The computer system according to claim 1, wherein said speaker container further comprises:

a first unit having a speaker retainer; and a second unit, substantially similar to said first unit and further having a speaker retainer, said first unit and said second unit mating in such a fashion as to securely retain said speaker within said speaker container.

3. The computer system according to claim 1 further comprising an acoustic dampening element placed on an interior surface of said speaker container.

4. The computer system according to claim 1 wherein said speaker is mounted to face an interior surface of said speaker container.

5. The computer system according to claim 1 wherein said speaker container comprises a front wall, a back wall, a top wall, a bottom wall, a side wall, and a second side wall, each wall having the same area.

6. The computer system according to claim 1 wherein said speaker port has a length that is ⅖ a depth of said speaker container and a diameter that is ⅕ a height of said speaker container.

7. The computer system according to claim 1 wherein said speaker is mounted behind said speaker port coupled to said speaker container.

8. The computer system according to claim 1 further comprising at least one fastener to couple said speaker to said speaker container and said speaker container to said CPU box.

9. A computer system comprising:

a central processing unit (CPU) box configured in a tower configuration, comprising:

a central processing unit;

a drive bay coupled to said central processing unit;

a speaker apparatus, coupled to said central processing unit and removably mounted towards a front, bottom portion of said CPU box, comprising:

a speaker container;

a speaker removably retained within said speaker container;

a speaker port coupled to said speaker container to provide acoustic coupling between said speaker and a region outside said speaker container;

a user input device, coupled to said central processing unit; and an output device, coupled to said central processing unit.

10. The computer system according to claim 9 wherein said speaker container further comprises:

a first unit having a speaker retainer; and a second unit, substantially similar to said first unit and further having a speaker retainer, said first unit and said second unit mating in such a fashion as to securely retain said speaker within said speaker container.

11. The computer system according to claim 9 further comprising an acoustic dampening element placed on an interior surface of said speaker container.

12. The computer system according to claim 9 wherein said speaker is mounted to face an interior surface of said speaker container.

13. The computer system according to claim 9 wherein said speaker container comprises a front wall, a back wall, a top wall, a bottom wall, a side wall, and a second side wall, each wall having the same area.

14. The computer system according to claim 9 wherein said speaker port has a length that is ⅘ a depth of said speaker container and a diameter that is ⅕ a height of said speaker container.

15. The computer system according to claim 9 wherein said speaker is mounted behind said speaker port coupled to said speaker container.

16. The computer system according to claim 9 further comprising at least one fastener to couple said speaker to said speaker container and said speaker container to said CPU box.

17. A computer system comprising:

a central processing unit (CPU) box configured in a desktop configuration, comprising:

a central processing unit;

a drive bay coupled to said central processing unit;

a speaker apparatus, coupled to said central processing unit and removably mounted towards a front side portion of said CPU box, comprising:

a speaker container;

a speaker removably retained within said speaker container;

a speaker port coupled to said speaker container to provide acoustic coupling between said speaker and a region outside said speaker container;

a user input device, coupled to said central processing unit; and an output device, coupled to said central processing unit.

18. The computer system according to claim 17 wherein said speaker container further comprises:

a first unit having a speaker retainer; and a second unit, substantially similar to said first unit and further having a speaker retainer, said first unit and said second unit mating in such a fashion as to securely retain said speaker within said speaker container.

19. The computer system according to claim 17 further comprising an acoustic dampening element placed on an interior surface of said speaker container.

20. The computer system according to claim 17 wherein said speaker is mounted to face an interior surface of said speaker container.

21. The computer system according to claim 17 wherein said speaker container comprises a front wall, a back wall, a top wall, a bottom wall, a side wall, and a second side wall, each wall having the same area.

22. The computer system according to claim 17 wherein said speaker port has a length that is ⅘ a depth of said speaker container and a diameter that is ¼ a length of said speaker container.

23. The computer system according to claim 17 wherein said speaker is mounted behind said speaker port coupled to said speaker container.

24. The computer system according to claim 17 further comprising at least one fastener to couple said speaker to said speaker container and said speaker container to said CPU box.

25. A method of assembling a computer system comprising:

providing an enclosure to contain said computer system;

securedly inserting a motherboard having a central processing unit within said enclosure;

securedly inserting a speaker module within said enclosure and coupling said speaker module to said motherboard, said speaker module inserting comprising:

selecting a first half of a speaker enclosure;

placing a speaker within said first half of said speaker enclosure;

mating a second half of said speaker enclosure to said first half of said speaker enclosure to form said speaker module; and securing said speaker module within said speaker enclosure via a fastener.

26. The method of assembling a computer system according to claim 25 wherein said speaker module inserting further comprises:

placing said speaker module in a lower front portion of said enclosure wherein said enclosure is a tower computer case.

27. The method of assembling a computer system according to claim 25 wherein said speaker module inserting further comprises:

placing said speaker module in a front side portion of said enclosure wherein said enclosure is a desktop computer case.

28. The method of assembling a computer system according to claim 25 wherein said placing said speaker further comprises orienting said speaker to be downward firing.

29. The method of assembling a computer system according to claim 25 wherein said placing said speaker further comprises orienting said speaker to be forward firing.

30. The method of assembling a computer system according to claim 25 wherein said placing said speaker further comprises placing a sound dampening element within said speaker module.

31. The method of assembling a computer system according to claim 25 further comprising placing a port within said speaker module.

* * * * *

UNITED STATES PATENT AND TRADEMARK OFFICE

CERTIFICATE OF CORRECTION

PATENT NO. : 6,546,298 B1
APPLICATION NO. : 09/098779
DATED : April 8, 2003
INVENTOR(S) : Jeffrey A. Bull It is certified that error appears in the above-identified patent and that said Letters Patent is hereby corrected as shown below:

In the drawings:

In FIG. 1, change reference numeral "28" to --18--

Please replace FIG. 1 with the following amended figure as shown below:

--

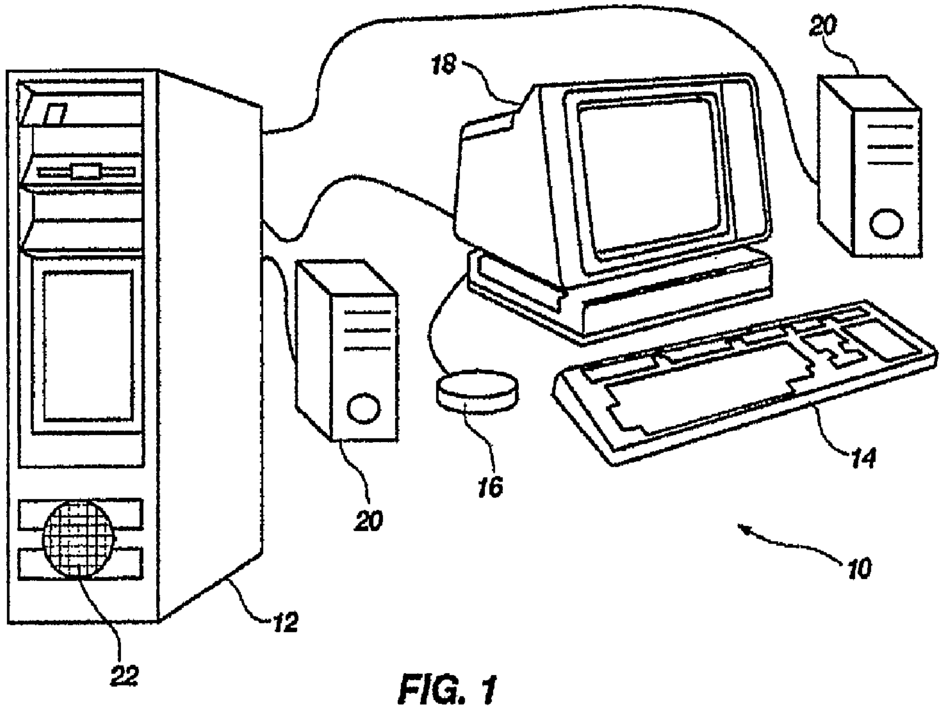

--

*FIG. 1*

In the specification:

| | | |
|---|---|---|
| COLUMN 1, | LINE 35, | change "small enclosed" to --small, enclosed-- |
| COLUMN 2, | LINE 22, | change "another out-of-the-way" to --another, out-of-the-way-- |
| COLUMN 2, | LINE 29, | change "is -well known" to --is well known-- |
| COLUMN 2, | LINE 40, | change "-multiple speaker" to -- multiple speaker -- |
| COLUMN 2, | LINE 48, | change "the-end user," to --the end user,-- |
| COLUMN 3, | LINE 67, | change "apparatus, woofer or subwoofer," to --apparatus (woofer or subwoofer,-- |
| COLUMN 4, | LINE 12, | change "unit CPU **30**" to --unit (CPU) **30**-- |
| COLUMN 4, | LINE 14, | change "single-or multi-chip" to --single- or multi-chip-- |

UNITED STATES PATENT AND TRADEMARK OFFICE

CERTIFICATE OF CORRECTION

PATENT NO. : 6,546,298 B1
APPLICATION NO. : 09/098779
DATED : April 8, 2003
INVENTOR(S) : Jeffrey A. Bull It is certified that error appears in the above-identified patent and that said Letters Patent is hereby corrected as shown below:

In the specification (cont'd):

| | | |
|---|---|---|
| COLUMN 4, | LINE 38, | change "box, woofer" to --box, subwoofer-- |
| COLUMN 4, | LINE 65, | change "width, would" to --width would-- |
| COLUMN 5, | LINE 40, | change "again size" to --again sized-- |
| COLUMN 5, | LINE 54, | change "allows then" to --allows them-- |

Signed and Sealed this

Ninth Day of October, 2007

JON W. DUDAS
*Director of the United States Patent and Trademark Office*